Patented Nov. 27, 1934

1,982,227

UNITED STATES PATENT OFFICE 1,982,227

COMPOSITION OF MATTER

William Henry Moss, London, England, assignor to Celanese Corporation of America, a corporation of Delaware No Drawing. Original application July 14, 1931, Serial No. 550,808. Divided and this application June 16, 1932, Serial No. 617,610. In Great Britain August 28, 1930

9 Claims. (Cl. 134—79)

This invention, which has been divided out of U. S. application S. No. 550,808, filed 14th July, 1931, relates to the production of compositions of matter and more particularly to coating or impregnating compositions which yield flexible films on evaporation of the solvent.

The use of cellulose esters in the production of compositions for coating and impregnating compositions is well known. The film left by these compositions is however usually fairly rigid and if subjected to any considerable bending or to repeated flexing is liable to crack, or to flake from the surface to which it is attached. The incorporation of relatively low proportions of plasticizers in the films improves to some extent their suppleness but the films even then do not approach the flexibility desired for many purposes. I have found that in order to attain a very high degree of flexibility it is necessary to incorporate high proportions of plasticizer, for example proportions of over 100% and especially proportions of 150 to 200 to 250% based on the cellulose ester in the films. However in many cases plasticizers are liable to bloom out when employed in large proportions owing to lack of compatibility with the other constituents of the film. Other plasticizers cause the film to remain sticky on evaporation of the solvent. Still others are slightly volatile and although the film may be supple when first made, yet in the course of time it becomes brittle once more. The difficulties therefore are greatly enhanced if the film is likely to be exposed to temperatures above the normal. Plasticizers have therefore been sought which combine qualities of a high degree of compatibility with other ingredients of cellulose ester lacquers or coating compositions, with lack of volatility, and will permit the production of surfaces which are not sticky, and which preferably retain these qualities when the surfaces in which they are present are exposed to temperatures up to for example 100° C.

It has now been found that plasticizers possessing these qualities include the tartrate ester plasticizers, for example dibutyl tartrate and amyl tartrate, (i. e. di-isoamyl tartrate). Compositions of matter containing cellulose esters and more than 100% of these plasticizers based on the cellulose ester present, and preferably between 150 and 250%, are eminently adapted for the production of flexible materials or for coating flexible materials, e. g. in coating wires, for coating or impregnating fabrics which are required to remain flexible, for example the sheaths of Bowden cables, and other flexible tubular structures, for artificial leather, and for water-proofing fabrics and for a large number of other purposes.

Examples of cellulose esters which may be employed in conjunction with the high proportion of plasticizer are cellulose acetate, cellulose formate, cellulose propionate, or other organic ester of cellulose. The cellulose ester and plasticizer may be dissolved separately in a volatile solvent and the two solutions mixed, or they may be dissolved in the same solvent. Examples of volatile solvents which may be employed are acetone, alcohol, benzene, methyl ethyl ketone, ethylene dichloride or mixtures of these, while the methyl ether of ethylene glycol, diacetone alcohol and ethyl lactate are examples of medium and high boiling solvents which may be employed.

Natural or synthetic resins may also be included in the composition to improve the strength, and, especially where the composition is to be used for coating purposes, to improve adhesion. Among synthetic resins suitable for this purpose are those obtainable by the condensation of phenols with aldehydes or ketones, diphenylol propane-formaldehyde resins, furfural-ketone, furfural amine, phenol-furfural resins, resins obtainable by the condensation of aldehydic or ketonic substances with aromatic amino or aryl sulphonamide or N-alkyl substituted aryl sulphonamide compounds, resins obtainable by the condensation of urea or thiourea with aldehydes or aldehydes and phenols, lactic acid resins, sulphurized phenol resins, resins obtainable by the polymerization of aldehydes or of vinyl compounds, and the resins obtainable by the condensation of phthalic anhydride or other dibasic acid anhydride or acid with polyhydric alcohols such for example as glycerol.

It is not essential that only one plasticizer should be employed, thus for example the plasticizer of high compatibility employed in accordance with this invention may be replaced in part by a plasticizer of lesser compatibility. Thus for example triphenyl phosphate, tricresyl phosphate, diphenylol propane, triacetin and diethyl phthalate may also be used but it is important that the quantities employed of these plasticizers should not be so great as to cause the composition to take on the disadvantages enumerated at the beginning of the specification. Any other desired ingredients may be incorporated, for example where coloured effects are required dyes and/or pigments may be added, or fire retardants, for example the tribrom acetanilides.

The following examples are intended to illustrate the present invention, but it is to be understood they are in no way limitative:—

Example 1

| | Parts |
|---|---|
| Cellulose acetate | 100 |
| Dibutyl tartrate | 150 |
| Triphenyl phosphate | 15 |
| Acetone | 500 |
| Methyl acetone | 500 |

Example 2

| | Parts |
|---|---|
| Cellulose acetate | 100 |
| Dibutyl tartrate | 200 |
| Tricresyl phosphate | 20 |
| Acetone | 500 |
| Alcohol | 250 |
| Benzene | 250 |

Example 3

| | Parts |
|---|---|
| Cellulose propionate | 100 |
| Amyl tartrate | 180 |
| Acetone | 800 |

Example 4

| | Parts |
|---|---|
| Cellulose acetate | 100 |
| Synthetic resin, e. g. diphenylol propane formaldehyde resin | 35 |
| Dibutyl tartrate | 200 |
| Tricresyl phosphate | 20 |
| Acetone | 500 |
| Dioxane | 100 |
| Methyl ether of ethylene glycol | 50 |
| Ethyl lactate | 20 |

What I claim and desire to secure by Letters Patent is:—

1. Coating and impregnating compositions comprising a cellulose ester and more than 100 parts of a tartrate ester plasticizer per 100 parts of cellulose ester, the said cellulose ester constituting the major proportion of the solid constituents of the composition.

2. Coating and impregnating compositions comprising a cellulose ester and more than 150 parts of a tartrate ester plasticizer per 100 parts of cellulose ester, the said cellulose ester constituting the major proportion of the solid constituents of the composition.

3. Coating and impregnating compositions comprising a cellulose ester and between 170 to 220 parts of a tartrate ester plasticizer per 100 parts of cellulose ester, the said cellulose ester constituting the major proportion of the solid constituents of the composition.

4. Coating and impregnating compositions comprising a cellulose ester and more than 100 parts of a tartrate ester plasticizer per 100 parts of cellulose ester together with a plasticizer of another type, the said cellulose ester constituting the major proportion of the solid constituents of the composition.

5. Coating and impregnating compositions comprising cellulose acetate and more than 100 parts of a tartrate ester plasticizer per 100 parts of cellulose acetate, the said cellulose acetate constituting the major proportion of the solid constituents of the composition.

6. Coating and impregnating compositions comprising cellulose acetate and more than 100 parts of a plasticizer selected from the group consisting of dibutyl tartrate and amyl tartrate per 100 parts of cellulose acetate, the said cellulose acetate constituting the major proportion of the solid constituents of the composition.

7. Coating and impregnating compositions comprising cellulose acetate and more than 150 parts of amyl tartrate per 100 parts of cellulose acetate, the said cellulose acetate constituting the major proportion of the solid constituents of the composition.

8. Coating and impregnating compositions comprising a cellulose ester and more than 150 parts of a tartrate ester plasticizer per 100 parts of cellulose ester and containing in addition a resin, the said cellulose ester constituting the major proportion of the solid constituents of the composition.

9. Materials and articles the surface at least of which contains a composition comprising a cellulose ester and more than 100 parts of a tartrate ester plasticizer per 100 parts of cellulose ester, the said cellulose ester constituting the major proportion of the solid constituents of the composition.

WILLIAM HENRY MOSS.